US008730259B2

(12) United States Patent
Araki et al.

(10) Patent No.: US 8,730,259 B2
(45) Date of Patent: May 20, 2014

(54) IMAGE DISPLAY DEVICE, IMAGE DISPLAY CONTROL METHOD AND PROGRAM (75) Inventors: Tetsuhisa Araki, Saitama (JP); Taisuke Goda, Tokyo (JP); Koushin Okudaira, Kanagawa (JP)

(73) Assignee: Sony Corporation (JP)

( * ) Notice: Subject to any disclaimer, the term of this patent is extended or adjusted under 35 U.S.C. 154(b) by 516 days.

(21) Appl. No.: 12/229,029

(22) Filed: Aug. 19, 2008

(65) Prior Publication Data

US 2009/0051700 A1 Feb. 26, 2009

(30) Foreign Application Priority Data

Aug. 22, 2007 (JP) ................. P2007-215675

(51) Int. Cl.
| | |
|---|---|
| G09G 5/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06K 9/62 | (2006.01) |
| G06K 9/68 | (2006.01) |
| G06K 9/70 | (2006.01) |
| G06K 9/74 | (2006.01) |

(52) U.S. Cl.
USPC ........... 345/619; 345/634; 715/204; 715/243; 715/730; 382/224

(58) Field of Classification Search
CPC .......... G06T 11/60; G06T 19/00; G09G 5/14; G09G 2340/125; G09G 5/40; G06F 3/0481; G06K 9/00664; G06K 9/00684; G06K 9/6218
USPC .................. 345/619, 634–637; 382/224–228; 715/200, 204, 243–245, 730–732
See application file for complete search history.

(56) References Cited

U.S. PATENT DOCUMENTS

| | | | | |
|---|---|---|---|---|
| 5,877,809 | A | * | 3/1999 | Omata et al. ................... 348/345 |
| 5,929,359 | A | * | 7/1999 | Sone et al. ...................... 84/610 |

(Continued)

FOREIGN PATENT DOCUMENTS

| | | |
|---|---|---|
| CN | 1630344 A | 6/2005 |
| JP | 2000-278563 A | 10/2000 |

(Continued)

OTHER PUBLICATIONS

Office Action from Japanese Application No. 2007-215675, dated Sep. 15, 2011.

(Continued)

*Primary Examiner* — Ke Xiao
*Assistant Examiner* — Jed-Justin Imperial
(74) *Attorney, Agent, or Firm* — Lerner, David, Littenberg, Krumholz & Mentlik, LLP (57) ABSTRACT An image grouping device which may comprise a first classifying unit for classifying a plurality of items of image data in a first predetermined unit, a second classifying unit for breaking the plurality of the items of image data classified by the first classifying unit into smaller groups in a second predetermined unit, and a control unit for controlling the plurality of the items of image data classified by the second classifying unit to be displayed on a display. The control unit may automatically select a background image according to background music during a slide show.

12 Claims, 7 Drawing Sheets

(56) References Cited

U.S. PATENT DOCUMENTS

| | | | |
|---|---|---|---|
| 6,211,912 B1* | 4/2001 | Shahraray | 348/228.1 |
| 7,546,544 B1* | 6/2009 | Weber et al. | 715/769 |
| 7,576,755 B2* | 8/2009 | Sun et al. | 345/629 |
| 7,605,796 B2 | 10/2009 | Kaminaga | |
| 7,755,674 B2 | 7/2010 | Kaminaga | |
| 7,912,366 B2* | 3/2011 | Huliyapur Math | 396/296 |
| 2003/0072486 A1 | 4/2003 | Loui et al. | |
| 2003/0184653 A1* | 10/2003 | Ohkubo | 348/207.1 |
| 2003/0222872 A1 | 12/2003 | Lin et al. | |
| 2004/0208377 A1* | 10/2004 | Loui et al. | 382/224 |
| 2005/0134708 A1* | 6/2005 | Lee et al. | 348/240.2 |
| 2006/0150215 A1 | 7/2006 | Wroblewski | |
| 2006/0220986 A1 | 10/2006 | Takabe et al. | |
| 2010/0128058 A1 | 5/2010 | Kawabata et al. | |

FOREIGN PATENT DOCUMENTS

| | | |
|---|---|---|
| JP | 2001228528 A | 8/2001 |
| JP | 2001337994 A | 12/2001 |
| JP | 2002032219 A | 1/2002 |
| JP | 2003203090 A | 7/2003 |
| JP | 2005196298 A | 7/2005 |
| JP | 2006092160 A | 4/2006 |
| JP | 2006245832 A | 9/2006 |
| JP | 2007194948 A | 8/2007 |

OTHER PUBLICATIONS

Office Action from Japanese Application No. 2007-215675, dated Apr. 10, 2012.
Office Action from Japanese Application No. 2013-049160, dated Jan. 7, 2014.

* cited by examiner

IMAGE DISPLAY DEVICE, IMAGE DISPLAY CONTROL METHOD AND PROGRAM

CROSS-REFERENCE TO RELATED APPLICATIONS

The present application claims priority from Japanese Patent Application No. JP 2007-215675, filed in the Japanese Patent Office on Aug. 22, 2007, the entire content of which is incorporated herein by reference.

BACKGROUND OF THE INVENTION

1. Field of the Invention

The present invention relates to an image display device which displays images, for example, particularly to a technical filed in which in displaying images, images are grouped in a predetermined unit, the images are further grouped in a predetermined unit broken into smaller groups to reproduce the images in the individual units.

2. Description of the Related Art

Heretofore, an image display device for displaying images is mounted with various functions for its display modes from the viewpoint of convenience of users. For example, Patent Reference 1 (JP-A-2000-278563) describes a digital camera which can switch the display area between a large area and a small area for display.

Then, in an imaging apparatus such as a digital camera as an image display device, as the capacity of a packaged memory is becoming larger and larger, image data for a large number of taken images can be stored in the memory. As the capacity of a memory is becoming larger and larger as described above, when a photographer continuously takes images with a digital camera for a longer time without externally making a backup of image data in a memory, he/she sometimes desires to arrange and display images at dates for finding a desired image instantaneously such that a date is specified to confirm an image taken at the desired date among a large number of images, and a listing of representative images in units of dates is displayed for every month.

In consideration of these desires, today, such an image display device is also developed that the image display device clusters image data in units of dates, divides the image data into groups referred to as "events", and then reproduces and displays images in units of the events, which is penetrating into market.

SUMMARY OF THE INVENTION

However, even though image data is clustered in units of dates and images are arranged and displayed in these units, the following problem remains.

In other words, for example, suppose the case in which images are taken during a trip, in some situations, a photographer takes images at point A, and then moves to point B for taking images. Although images are taken in units with some intervals, the images are displayed in groups at individual dates. Therefore, in the techniques before, in order to confirm images in units of taking images, the following schemes can be merely adopted: the scheme in which images are manually recorded in separate folders in taking images, the scheme in which a listing of still images is seen on a listing screen and a desired image is selected when browsed, or the scheme in which images are confirmed and forwarded one at a time on a display screen for single image reproduction. Thus, it is difficult to efficiently display images grouped in units of taking images. In other words, the unit for grouping images does not fully satisfy the needs of users.

As described above, in the field of camera business in recent years, although a large capacity memory is incorporated inside a camera to store a large number of images, some functions may be needed to automatically group or display a large number of these images in units broken into smaller groups.

Thus, it is desirable to break image data classified in a predetermined unit into smaller groups to display the image data in the units broken into smaller groups.

An image display device according to an embodiment of the invention is an image display device including: a storage means for storing a plurality of items of image data; a first classifying means for classifying the plurality of the items of image data in a first predetermined unit; a second classifying means for breaking the plurality of the items of image data classified by the first classifying means into smaller groups in a second predetermined unit; a display control means for controlling display in such a way that images are displayed in the second predetermined unit based on the image data broken into smaller groups by the second classifying means; and a display means for performing a predetermined display based on the control performed by the display control means.

Therefore, image data broken into smaller groups in a second predetermined unit is controlled in such a way that the image data can be displayed in the second predetermined unit.

An image display device according to an embodiment of the invention is an image display device including: a storage means for storing a plurality of items of image data; an event clustering means for grouping a group of image data taken on close dates and times into an event in the plurality of the items of image data; a scene change detecting means for detecting a timing of a scene change; a subevent clustering means for grouping a group of image data classified by the event clustering means and contained in an event into a subevent broken into a smaller group based on the timing of a scene change detected by the scene change detecting means; a display control means for controlling display in such a way that images are displayed in units of subevents broken into smaller groups by the subevent clustering means; and a display means for performing a predetermined display based on the control performed by the display control means.

Therefore, image data grouped into subevents is controlled in such a way that the image data can be displayed in the units of the subevents.

An image display control method according to an embodiment of the invention is an image display control method including the steps of: storing a plurality of items of image data; grouping a group of image data taken on close dates and times into an event in the plurality of the items of image data; detecting a timing of a scene change; grouping a group of image data contained in the event into a subevent broken into a smaller group based on the timing of a scene change; and controlling display in such a way that images are displayed in the units of the subevents.

Therefore, image data grouped into subevents is controlled in such a way that the image data can be displayed in the units of the subevents.

A program according to an embodiment of the invention is a program which allows a computer to provide: an event clustering function of grouping a group of image data taken on close dates and times into an event in the plurality of the items of image data; a scene change detecting function of detecting a timing of a scene change; a subevent clustering function of grouping a group of image data classified by the event clustering function and contained in an event into a subevent broken into a smaller group based on the timing of a scene change detected by the scene change detecting function; and a display control function of controlling display in such a way that images are displayed in units of subevents broken into smaller groups by the subevent clustering function.

Therefore, in accordance with software processing by a computer, image data grouped into subevents is controlled in such a way that the image data can be displayed in the units of the subevents.

According to the embodiments of the invention, an image display device, an image display control method and a program can be provided, which can further break image data classified in a predetermined unit into smaller groups to display the image data in the units broken into smaller groups.

DESCRIPTION OF THE PREFERRED EMBODIMENTS

Hereinafter, the best mode for implementing the invention (simply referred to as embodiment below) will be described in detail with reference to the drawings.

Figure 1:
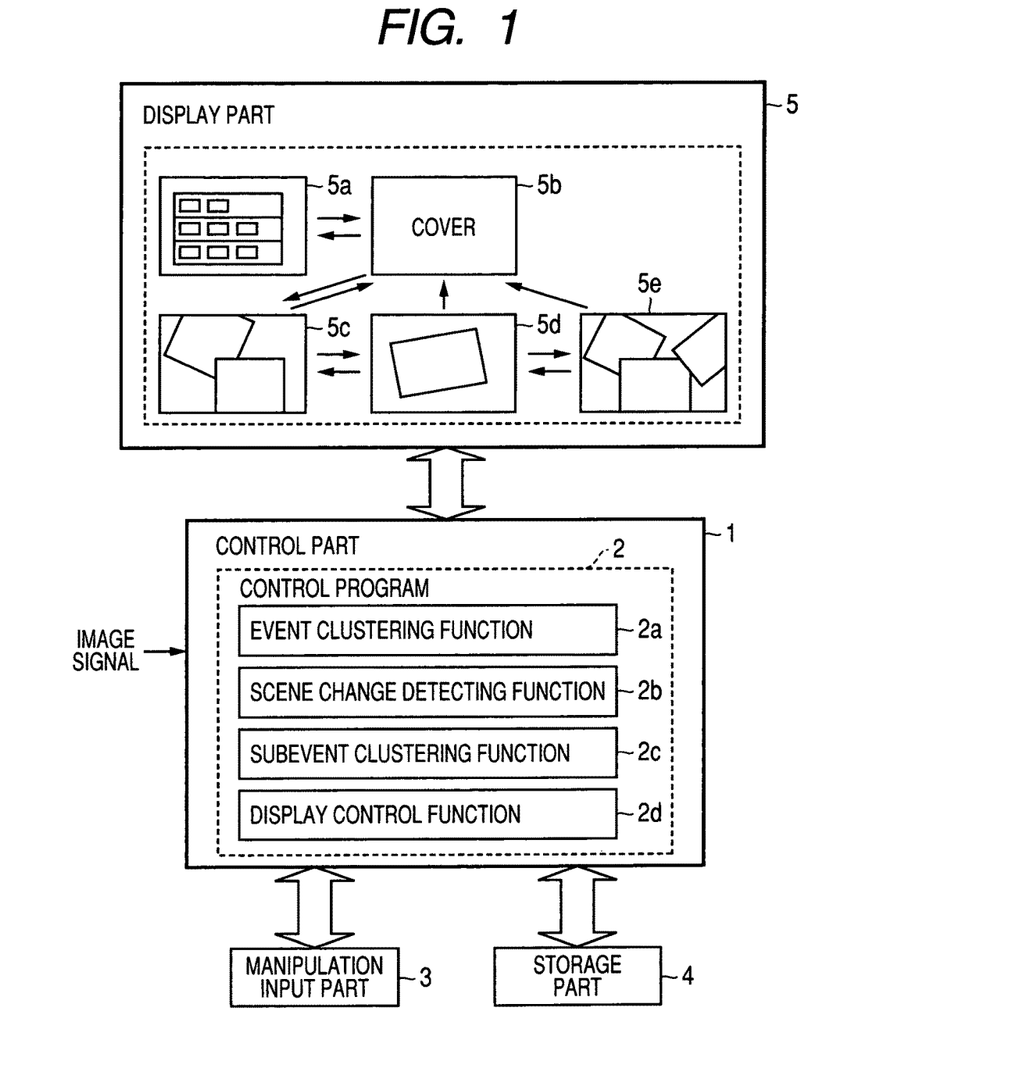
FIG. 1 shows a block diagram depicting an image display device according to a first embodiment of the invention.

FIG. 1 shows and describes the configuration of an image display device according to a first embodiment of the invention.

As shown in FIG. 1, the image display device is formed of a control part 1 that conducts overall control, a manipulation input part 3, a storage part 4, and a display part 5. Then, the control part 1 reads and executes a control program 2 stored in the storage part 4 to provide an event clustering function 2a, a scene change detecting function 2b, a subevent clustering function 2c, and a display control function 2d.

In addition, when the control part 1 executes the control program 2 stored in the storage part 4 to provide the individual functions 2a to 2d, the functions play the roles of an event clustering means, a scene change detecting means, a subevent clustering means, and a display control means. In a broader sense, for example, the event clustering means corresponds to a first classifying means, and the scene change detecting means and the subevent clustering means correspond to a second classifying means.

Figure 2:
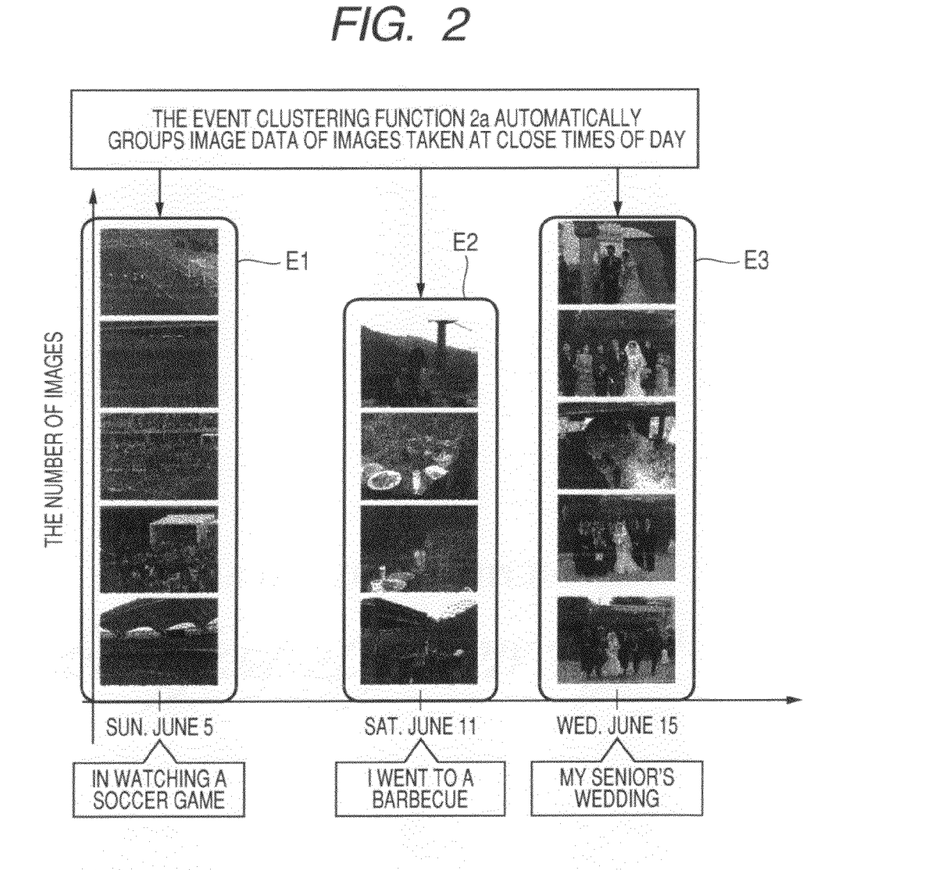
FIG. 2 shows a conceptual diagram illustrative of events.

As shown in FIG. 2, the event clustering function 2a is a function of automatically grouping image data of images taken at close times of day in a unit referred to as "an event".

In the example shown in FIG. 2, a group of images taken on "Sun. June 5" is grouped as event E1 by the title "in watching a soccer game", a group of images taken on "Sat. June 11" is grouped as event E2 by the title "I went to a barbecue", and a group of images taken on "Wed. June 15" is grouped as event E3 by the title "my senior's wedding". A user freely gives titles by manipulating the manipulation input part 3.

For example, the scene change detecting function 2b is a function of detecting a change of a taken scene based on the interval between the times of day of taking images, the distance to a subject, and changes in the brightness of a subject, and notifying the subevent clustering function 2c, described later, about the change in the taken scene as the timing of separation of grouping by "subevents" that "the event" is broken into smaller groups. In the imaging apparatus such as a digital camera, information in taking images (such as an AF value and an AE value) is recorded together with taken image data, and in the case in which this image display device is adapted to an imaging apparatus, these value are referenced. Hereinafter, as an example, changes in intervals of the times of day of taking an image are detected as a trigger for scene changes.

Figure 3:
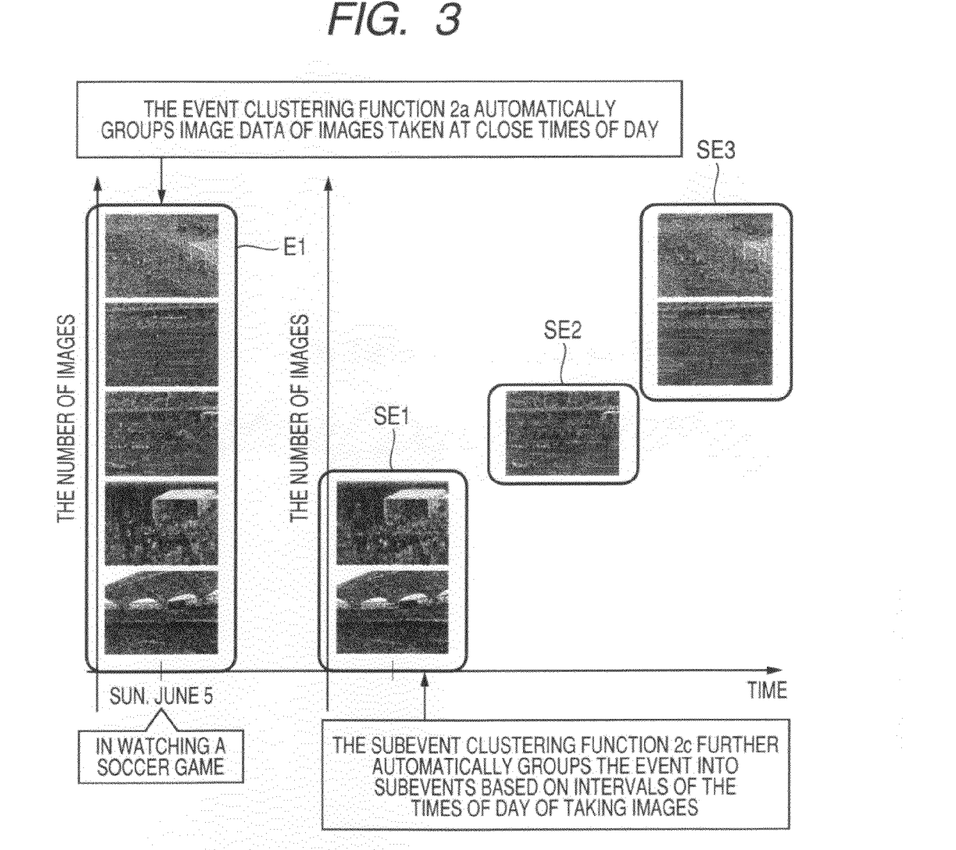
FIG. 3 shows a conceptual diagram illustrative of subevents.

The subevent clustering function 2c is a function of receiving the notification about the timing of separation of grouping by "subevents" from the scene change detecting function 2b, grouping image data by subevents as shown in a conceptual diagram in FIG. 3, and further clustering images divided in units of the events. In other words, in the example shown in FIG. 3, the event clustering function 2a groups images taken at close times of day into the event E1, and then the subevent clustering function 2c further clusters the event E1 into three subevents SE1, SE2 and SE3 based on intervals of the times of day of taking images.

The display control function 2d is a function of controlling display in units of events performed by the event clustering function 2a and display in units of subevents performed by the subevent clustering function 2c.

In other words, although the detail will be described later, the display control function 2d displays a screen 5a for showing a listing of events, a cover screen 5b, and screens 5c to 5e for showing images in units of subevents.

In addition, a mode of showing images in units of subevents is referred to as "a scrapbook display mode". In the case in which the scrapbook display mode is selected, viewed images are automatically classified into subevents by the subevent clustering function 2c as discussed above. Hereinafter, groups of images clustered into subevents are referred to as "a page".

Figure 4:
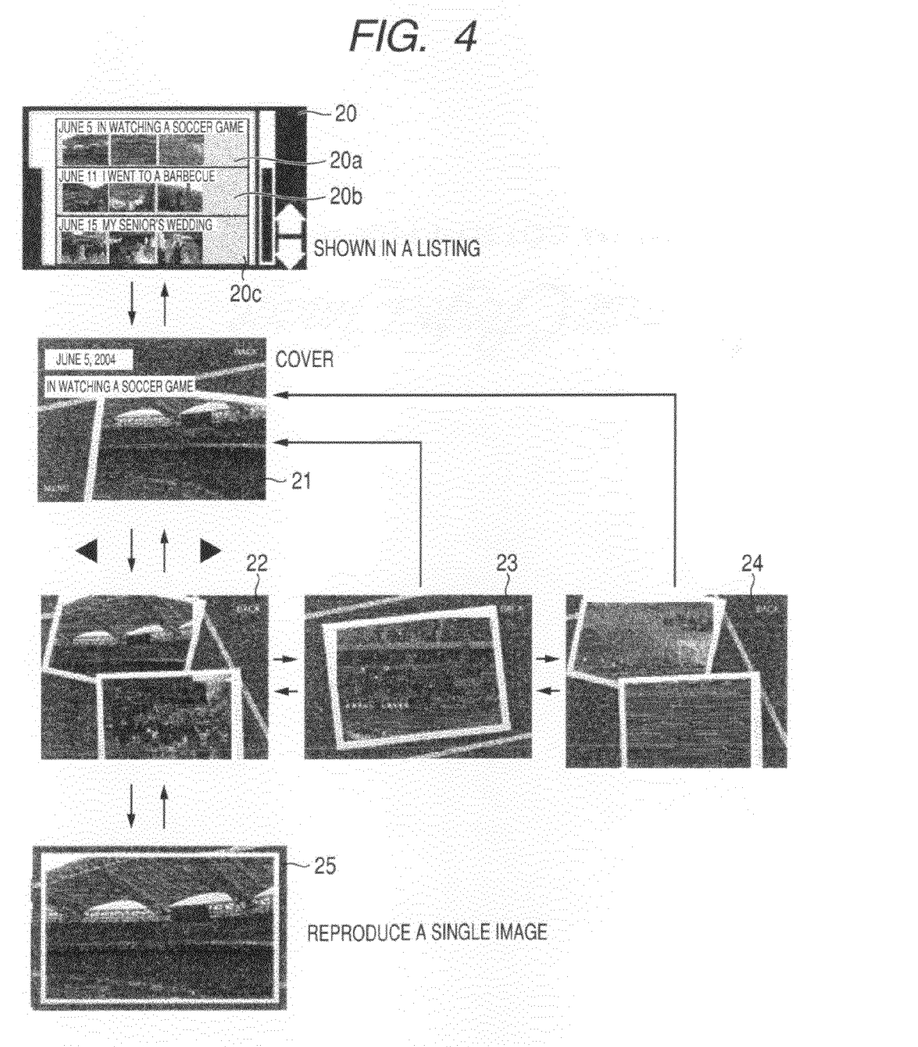
FIG. 4 shows a diagram depicting exemplary screen changes in the case in which images are displayed in units of subevents in a scrapbook display mode.

Here, FIG. 4 shows and describes screen changes in the case in which the scrapbook display mode is selected. The control part 1 uses the display control function 2d of the control program 2 to display a screen 20 for showing a listing of events grouped by the event clustering function 2a. On the screen 20, three events are displayed together with titles. When a desired event is selected among three events by user manipulation of the manipulation input part 3, the mode is moved to "a cover reproduction mode", and the display control function 2d displays a cover screen 21. On the cover screen 21, representative images of events and data such as taken dates are displayed. As described above, a manipulation is made after the cover is displayed, and then the mode is moved to "the scrapbook display mode".

The mode is moved from the cover reproduction mode to the scrapbook display mode, and then the control part 1 uses the display control 2d to change the screens in units of subevents clustered by the subevent clustering function 2c. In other words, in this example, subevents SE1 to SE2 shown in a conceptual diagram in FIG. 3 are displayed on screens 22 to 24, respectively. In addition, subevents can be freely returned from the screens 22 to 24 to the cover screen 21. In the case in which the number of the classified images exceeds a certain number, the images are arranged on a plurality of pages for display.

In the scrapbook display mode, pages are forwarded or backed, and then pages are in turn displayed, and automatic forwarding (a slide show) is specified, and then pages are in turn displayed.

During the display of images on the screens 22 to 24, a manipulation is made on a desired screen, the mode is then moved to "a single image reproduction mode", and the control part 1 uses the display control function 2*d* of the control program 2 to reproduce and display a single image as shown on a screen 25. In addition, the screen can be returned from the screen 25 to the screen 22 as necessary. The sequence of screen changes is as described above.

Figure 5:
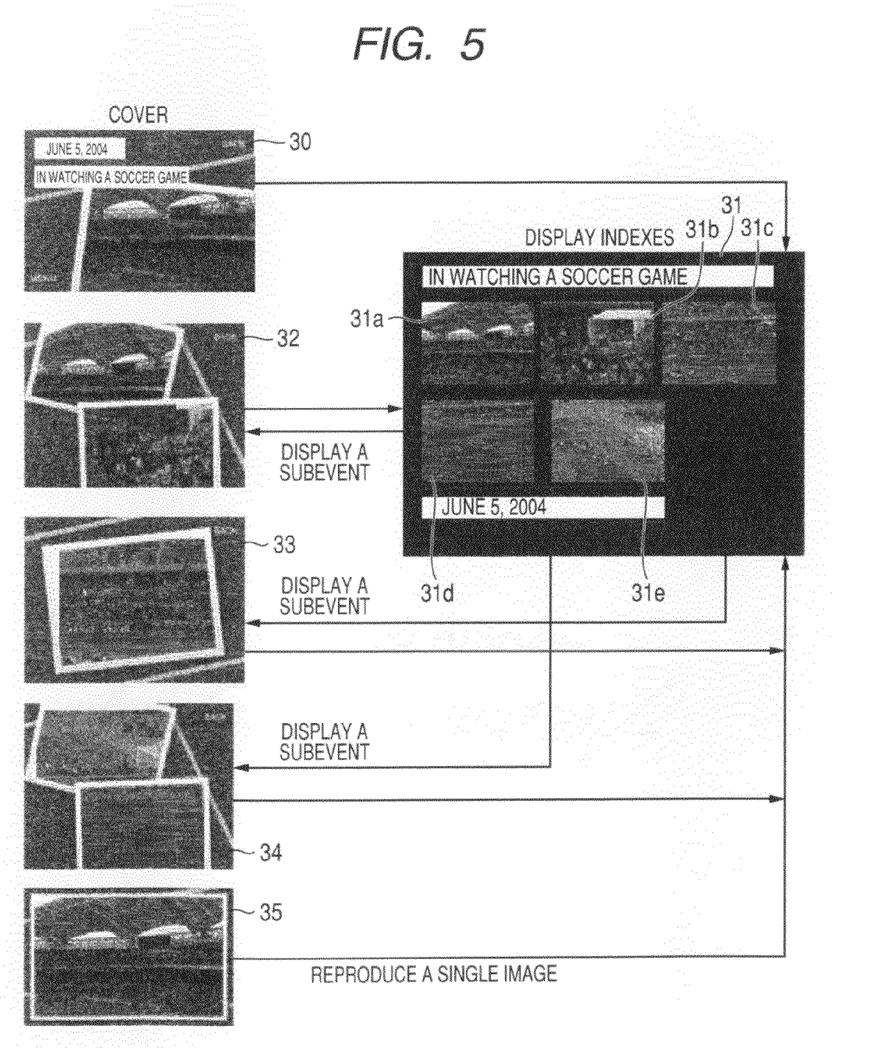
FIG. 5 shows a diagram depicting another way of exemplary screen changes in the case in which images are displayed in units of subevents in the scrapbook display mode.

Here, FIG. 5 shows and describes another way of screen changes in the case in which the scrapbook display mode is selected. In this example, the screen is moved from a cover screen 30 to an index display screen 31. On the index display screen 31, all the images of subevents SE1 to SE3 are displayed in indexes. A desired image is selected among the images displayed in indexes, and then the screen is moved to display subevents (screens 32 to 34). The screen 32 is a display screen for the subevent SE1, the screen 33 is a display screen for the subevent SE2, and the screen 34 is a display screen for the subevent SE3. Also in this example, the screen can be returned from the screens 32 to 34 to the screen 30 for the cover image as necessary. In the case in which the number of the classified images exceeds a certain number, the images are arranged on a plurality of pages for display. The screen can be returned as well from the screen 31 for the indexes to a screen 35 for reproducing a single image.

Figure 6:
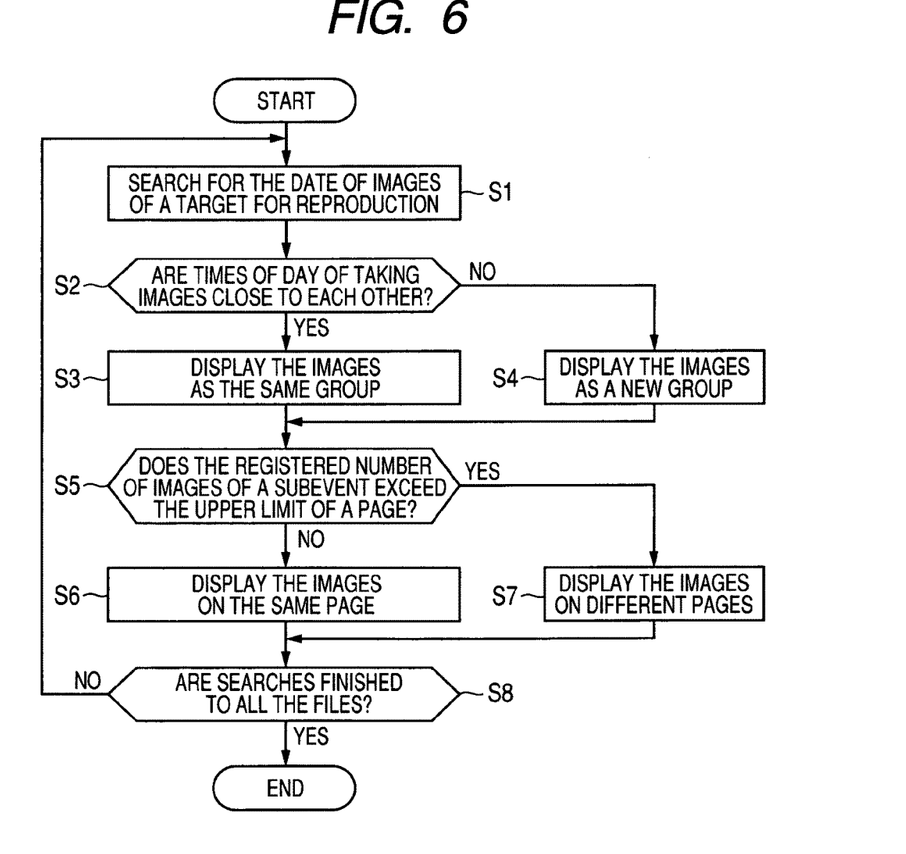
FIG. 6 shows a flow chart illustrative of a process flow of image display by the image display device according to the first embodiment of the invention.

Hereinafter, a process flow for displaying images by the image display device according to the first embodiment of the invention will be described with reference to a flow chart shown in FIG. 6.

In addition, the process below also corresponds to an image display control method according to the first embodiment.

The process is started, and then the control part 1 uses the event clustering function 2*a* of the control program 2 to search for the date of images of a target for reproduction. Based on the searched date, the images are grouped into an event (Step S1). Subsequently, based on the scene change detecting function 2*b* of the control program 2, the control part 1 determines whether times of day of taking the images are close to each other (Step S2). Here, if the times of day of taking the images are close to each other (Step S2 is branched to Yes), the images are grouped into the same subevent by the subevent clustering function 2*c*, and the images are displayed as the same group, that is, the same subevent by the display control function 2*d* (Step S3).

On the other hand, if the times of day of taking images are not close to each other (Step S2 is branched to No), the images are grouped into a new subevent by the subevent function 2*c*, and the images are displayed as a new group, that is, a new subevent by the display control function 2*d* (Step S4).

Subsequently, the control part 1 determines whether the registered number of images of a subevent exceeds the upper limit of a page (Step S5). If the number does not exceed the upper limit (Step S5 is branched to No), the images are displayed on the same page (Step S6), and if the number exceeds the upper limit (Step S5 is branched to Yes), the images are displayed on different pages (Step S7). As described above, the control part 1 determines whether searches are finished to all the files (Step S8). If searches are not finished to all the files (Step S8 is branched to No), the process is returned to Step S1, and the process steps are repeated. On the other hand, if searches are finished to all the files (Step S8 is branched to Yes), the sequence of the process steps is ended.

Next, a second embodiment of the invention will be described.

Figure 7:
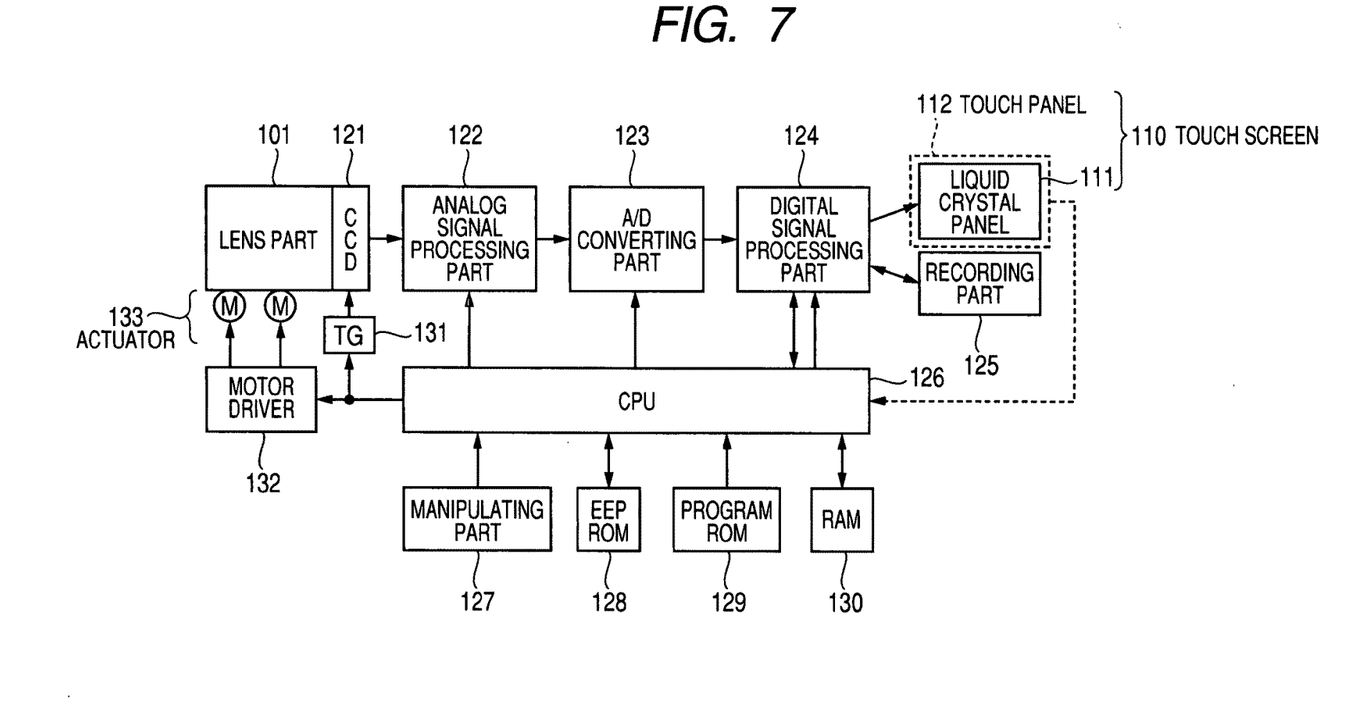
FIG. 7 shows a block diagram depicting an imaging apparatus according to a second embodiment of the invention.

FIG. 7 shows and describes the configuration of an imaging apparatus according to the second embodiment of the invention.

This is the embodiment in which the image display device according to the first embodiment described above is adapted to an imaging apparatus such as a digital still camera and a digital video camera. Hereinafter, the imaging apparatus will be described in detail.

As shown in FIG. 7, the imaging apparatus according to the second embodiment is provided with a lens part 101 conceptually including a lens, a diaphragm, and a focus lens. Then, on the optical path of the light of a subject incident through the lens part 101, an imaging device 121 such as a CCD (Charge Coupled Device) is arranged. The output of the imaging device 121 is connected to the input of a digital signal processing part 124 through an analog signal processing part 122, and an analog/digital (A/D) converting part 123. Then, the output of the digital signal processing part 124 is electrically connected to the inputs of a liquid crystal panel 111 and a recording part 125.

To the lens part 101, an actuator 133 is mechanically connected for adjusting the diaphragm configuring the lens part 101 and moving the focus lens. Then, the actuator 133 is connected to a motor driver 132 for drive control of the actuator 133.

Moreover, the imaging apparatus is provided with a CPU (Central Processing Unit) 126 for overall control. The CPU 126 is connected to the motor driver 132, a timing generator (TG) 131, a manipulating part 127, an EEPROM (Electrically Erasable Programmable ROM) 128, a program ROM (Read Only Memory) 129, a RAM (Random Access Memory) 130, and a touch panel 112.

In addition, the CPU 126 reads and executes the control program stored in the program ROM 129, and then the CPU 126 functions as a control means, particularly as the event clustering means, the scene change detecting means, the subevent clustering means, and the display control means.

The touch panel 112 and the liquid crystal panel 111 form a touch screen 110.

For example, the recording part 125 is a large capacity memory such as a flash memory.

The EEPROM 128 is provided to store data such as various items of set information to be held at the time of turning off a power source. The program ROM 129 is provided to store a program executed by the CPU 126 and data necessary to execute the program. Then, the RAM 130 is provided as a work area to temporarily store the program and data necessary for the CPU 126 to execute various processes.

In this configuration, the CPU 126 executes the program recorded on the program ROM 129 to control the individual components configuring the imaging apparatus, and performs a predetermined process in response to a signal from the touch panel 112 and a signal from the manipulating part 127. The manipulating part 127 is manipulated by a user to supply a signal corresponding to the manipulation to the CPU 23.

In other words, the touch panel 112 is pressed down by a user touching a given position with a finger, that is, the user makes a predetermined manipulation input, the touch panel 112 detects the coordinates of the pressed position, the signal corresponding to the coordinates is sent to the CPU 126, and the CPU 126 acquires a predetermined item of information corresponding to the coordinates to perform a predetermined process based on the information.

When the light of the subject enters through the lens part 101, the imaging device 121 images and subjects the light of the subject to photoelectric conversion, and outputs analog image signals. At this time, under control performed by the CPU 126, the motor driver 132 drives the actuator 133. By this drive, the lens part 101 is exposed from or accommodated in the cabinet of the imaging apparatus. In addition, the diaphragm configuring the lens part 101 is adjusted, and the focus lens configuring the lens part 101 is moved.

Moreover, under control performed by the CPU 126, the timing generator 131 supplies a timing signal to the imaging device 121. Based on the timing signal, an exposure time in the imaging device 121 is controlled. The imaging device 121 is operated based on the timing signal supplied from the timing generator 131, whereby the imaging device 121 receives and subjects the light from the subject incident through the lens part 101 to photoelectric conversion, and supplies analog image signals as electric signals matched with the received light quantity to the analog signal processing part 122.

Under control performed by the CPU 126, the analog signal processing part 122 applies analog signal processing (amplification) to the analog image signals sent from the imaging device 121, and supplies the resulting image signals to the A/D converting part 123.

After that, under control performed by the CPU 126, the A/D converting part 123 subjects the analog image signals from the analog signal processing part 122 to A/D conversion, and supplies the resulting digital image data to the digital signal processing part 124. Under control performed by the CPU 126, the digital signal processing part 124 applies digital signal processing such as noise removal processing to the digital image signals from the A/D converting part 123, and supplies the signals to the liquid crystal panel 111 for display.

The digital signal processing part 124 compresses the digital image signals from the A/D converting part 123 by the JPEG (Joint Photographic Experts Group) format, for example, and supplies the resulting compressed digital image signals to the recording part 125 for recording the signals.

Furthermore, the digital signal processing part 124 decompresses the compressed image data recorded on the recording part 125, and supplies the resulting image data to the liquid crystal panel 111 for display. In other words, the digital signal processing part 124 supplies image data from the A/D converting part 123 to the liquid crystal panel 111, and a so-called live view is displayed on the liquid crystal panel 111.

After that, the user presses down a shutter button conceptually included in the manipulating part 127, and then a release signal is supplied from the manipulating part 127 to the CPU 126. After the release signal is supplied to the CPU 126 in this manner, the CPU 126 controls the digital signal processing part 124 to compress the image data supplied from the A/D converting part 123 to the digital signal processing part 124 and to record the compressed image data on the recording part 125.

Here, the following advantage is featured.

In other words, the CPU 126 reads image data stored in the recording part 125 based on the control program stored in the program ROM 129, groups the image data into events based on dates of taking the image data, further breaks the event into smaller subevents based on the times of day of taking images, and controls the image data to be displayed on the liquid crystal panel 111 in units of events and subevents. Since the detail of display of image data in units of subevents is the same as the first embodiment as described above, the overlapping descriptions are omitted.

As discussed above, according to the first and second embodiments of the invention, in an event display mode, images recorded in the built-in memory can be displayed in such a way that taken images are arranged in the individual events. Moreover, in the scrapbook display mode, taken images of the individual events are further grouped into subevents, and the images can be arranged and displayed in the individual subevents. The images in the subevent can be classified into a single page or a plurality of pages for display. In addition, the page of the subevent is forwarded, and then a page on which a plurality of completed images is shown is displayed. Even though a plurality of images is shown on this page, one of images is specified and then that single image can be reproduced. Furthermore, if a desired image is selected from a listing, the page of the subevent to which the selected image belongs can be displayed. Automatic forwarding is selected, and then the pages of the subevents can be in turn displayed.

As described above, the embodiments of the invention have been described, but embodiments of the invention are not limited thereto, which can be improved and modified variously within the scope of the teachings of the embodiments of the invention.

For example, for the detection of scene changes by the scene change detecting function, it is without saying that such a scheme may be possible that turning on/off the power source is considered as a separation, the timing of the separation is detected as the timing for a scene change when the power source is turned on/off, and the separation is considered as a separation for a subevent to cluster images into subevents. Alternatively, such a scheme may be possible that the timings of switching various modes such as a sports mode and a landscape mode are detected as the timing for a scene change, and the timing is considered as the timing of a separation to cluster images into subevents.

Moreover, in the case in which images are displayed in units of subevents in the scrapbook display mode, a predetermined background image can be selected. However, in the case in which images are displayed in units of subevents by automatic forwarding such as a slide show, when a piece of background music (BGM) is outputted, a preferable background image may be automatically selected corresponding to the selection of the piece of BGM. In this case, a piece of BGM is matched with a background image by a predetermined ID, and they are managed in a table. In addition, naturally, the timing of clustering images into subevents is set to the timing of turning on/off the power source. In addition, the timing of separation of subevents may be forcefully set by manual operation.

It should be understood by those skilled in the art that various modifications, combinations, sub-combinations and alterations may occur depending on design requirements and other factors insofar as they are within the scope of the appended claims or the equivalents thereof.

What is claimed is:

1. An image grouping device comprising:
    a first classifying means for classifying a plurality of items of image data in a first predetermined unit;
    a second classifying means for breaking the plurality of the items of image data classified by the first classifying means into smaller groups in a second predetermined unit; and
    a control means for controlling the plurality of the items of image data classified by the second classifying means to be displayed on a display;

wherein the control means automatically selects a background image according to background music during a slide show, wherein a first cover screen is provided for displaying information indicative of the first predetermined unit, a plurality of subevent cover screens, accessible from the first cover screen, are provided for displaying information indicative of respective second predetermined units, at least one of the subevent cover screens including a plurality of images of the corresponding second predetermined unit displayed in an overlapped fashion, and an image included in a particular second predetermined unit being accessible through the subevent cover screen corresponding to the particular second predetermined unit, wherein the first cover screen includes (i) a plurality of images of the corresponding first predetermined unit displayed in an overlapped fashion and (ii) text, the text being superimposed on the plurality of images of the corresponding first predetermined unit and being indicative of a date and subject related to the first predetermined unit, and wherein the first cover screen is displayed for each of (i) an event being selected from a screen displaying a listing of events, and (ii) a scrapbook mode being exited.

2. The image grouping device according to claim 1,
wherein the control means first displays the plurality of items of image data in the first predetermined unit by a list, and
when a desired item is selected from the list, the control means displays corresponding items in the second predetermined unit.

3. The image grouping device according to claim 1,
further comprising a storage means which stores therein image data, and attribute information indicating an event and a subevent to which the image data belongs, together with the image data.

4. An image display control method comprising the steps of:
grouping a group of image data taken on close dates and times into an event in a plurality of items of image data;
detecting a timing of a scene change;
second grouping a group of image data contained in the event into a subevent broken into a smaller group based on the timing of a scene change; and
controlling the group of image data from the second grouping step,
wherein the controlling step controls a display to display all images of the group of image data from the second grouping step in the display, and overlap the images so at least a part of each image is displayed on the display,
wherein a first cover screen is provided for displaying information indicative of the event, a plurality of subevent cover screens, accessible from the first cover screen, are provided for displaying information indicative of respective subevents, at least one of the subevent cover screens including a plurality of images of the corresponding subevent displayed in an overlapped fashion, and an image included in a particular subevent being accessible through the subevent cover screen corresponding to the particular subevent,
wherein the first cover screen includes (i) a plurality of images of the corresponding event displayed in an overlapped fashion and (ii) text, the text being superimposed on the plurality of images of the corresponding event and being indicative of a date and subject related to the event, and
wherein the first cover screen is displayed for each of (i) an event being selected from a screen displaying a listing of events, and (ii) a scrapbook mode being exited.

5. The image display control method according to claim 4,
wherein the controlling step comprises controlling the display to display the plurality of items of image data in the event by a list, and
when a desired item is selected from the list, the controlling step comprises controlling the display to display corresponding items in the subevent.

6. The image display control method according to claim 4,
further comprising storing image data and attribute information, indicating an event and a subevent to which the image data belongs, together with the image data.

7. A non-transitory computer-readable memory having stored thereon a program which allows a computer to provide:
an event clustering function of grouping a group of image data taken on close dates and times into an event in a plurality of items of image data;
a scene change detecting function of detecting a timing of a scene change;
a subevent clustering function of grouping a group of image data classified by the subevent clustering function and contained in an event into a subevent broken into a smaller group based on the timing of a scene change detected by the scene change detecting function; and
a display control function of controlling the group of image data from the subevent clustering function,
wherein the display control function controls a display to display all images of the group of image data from the subevent clustering function in the display, and overlap the images so at least a part of each image is displayed on the display,
wherein a first cover screen is provided for displaying information indicative of the event, a plurality of subevent cover screens, accessible from the first cover screen, are provided for displaying information indicative of respective subevents, at least one of the subevent cover screens including a plurality of images of the corresponding subevent displayed in an overlapped fashion, and an image included in a particular subevent being accessible through the subevent cover screen corresponding to the particular subevent,
wherein the first cover screen includes (i) a plurality of images of the corresponding event displayed in an overlapped fashion and (ii) text, the text being superimposed on the plurality of images of the corresponding event unit and being indicative of a date and subject related to the event, and
wherein the first cover screen is displayed for each of (i) an event being selected from a screen displaying a listing of events, and (ii) a scrapbook mode being exited.

8. The computer-readable medium according to claim 7,
wherein the display control function first displays the plurality of items of image data in the event by a list, and
when a desired item is selected from the list, the display control function displays corresponding items in the subevent.

9. The computer-readable medium according to claim 7,
wherein the program allows the computer to further provide a storage function which stores image data and attribute information, indicating an event and a subevent to which the image data belongs, together with the image data.

10. An image grouping device comprising:
a first classifying unit configured to classify a plurality of items of image data in a first predetermined unit;

a second classifying unit configured to break the plurality of the items of image data classified by the first classifying unit into smaller groups in a second predetermined unit; and a control unit configured to control the plurality of the items of image data classified by the second classifying unit to be displayed on a display;

wherein the control unit automatically selects a background image according to background music during a slide show, wherein a first cover screen is provided for displaying information indicative of the first predetermined unit, a plurality of subevent cover screens, accessible from the first cover screen, are provided for displaying information indicative of respective second predetermined units, at least one of the subevent cover screens including a plurality of images of the corresponding second predetermined unit displayed in an overlapped fashion, and an image included in a particular second predetermined unit being accessible through the subevent cover screen corresponding to the particular second predetermined unit, wherein the first cover screen includes (i) a plurality of images of the corresponding first predetermined unit displayed in an overlapped fashion and (ii) text, the text being superimposed on the plurality of images of the corresponding first predetermined unit and being indicative of a date and subject related to the first predetermined unit, and wherein the first cover screen is displayed for each of (i) an event being selected from a screen displaying a listing of events, and (ii) a scrapbook mode being exited.

11. The image grouping device according to claim 10, wherein the control unit first displays the plurality of items of image data in the first predetermined unit by a list, and when a desired item is selected from the list, the control unit displays corresponding items in the second predetermined unit.

12. The image grouping device according to claim 10, further comprising a storage unit which stores therein image data, and attribute information indicating an event and a subevent to which the image data belongs together with the image data.

* * * * *